(12) United States Patent
Chen et al.

(10) Patent No.: US 6,532,018 B1
(45) Date of Patent: Mar. 11, 2003

(54) COMBINED FLOATING-POINT LOGIC CORE AND FRAME BUFFER

(75) Inventors: Edward C. Chen, Los Altos, CA (US); Mark S. Grossman, Palo Alto, CA (US); Chi-Shung Wang, Fremont, CA (US); John S. Montrym, Los Altos, CA (US); Mark M. Leather, Saratoga, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/294,546

(22) Filed: Apr. 19, 1999

(Under 37 CFR 1.47)

(51) Int. Cl.[7] .................... G06F 13/14; G09G 5/397; G09G 5/00

(52) U.S. Cl. ............... 345/519; 345/546; 345/552; 345/611

(58) Field of Search ................... 345/501, 503, 345/519, 531, 541, 543, 552, 422, 430, 434, 435, 561, 611–616

(56) References Cited

U.S. PATENT DOCUMENTS

| | | | |
|---|---|---|---|
| 5,706,481 A | * | 1/1998 | Hannah et al. ............. 345/519 |
| 5,867,180 A | * | 2/1999 | Katayama et al. .......... 345/512 |
| 6,008,813 A | * | 12/1999 | Lauer et al. ................ 345/424 |
| 6,026,478 A | * | 2/2000 | Dowling ...................... 712/24 |
| 6,052,773 A | * | 4/2000 | DeHon et al. ............... 712/43 |
| 6,097,403 A | * | 8/2000 | McMinn ...................... 345/519 |
| 6,104,418 A | * | 8/2000 | Tanaka et al. .............. 345/521 |
| 6,118,452 A | * | 9/2000 | Gannett ....................... 345/418 |
| 6,128,025 A | * | 10/2000 | Bright et al. ................ 345/504 |
| 6,133,901 A | * | 10/2000 | Law ............................. 345/136 |
| 6,154,223 A | * | 11/2000 | Baldwin ...................... 345/506 |
| 6,215,497 B1 | * | 4/2001 | Leung ......................... 345/419 |
| 6,219,073 B1 | * | 4/2001 | Suzuoki ....................... 345/526 |
| 6,295,068 B1 | * | 9/2001 | Peddada et al. ............ 345/419 |

FOREIGN PATENT DOCUMENTS

EP 0 752 685 A1 7/1996

OTHER PUBLICATIONS

Hilgenstock, J., Herrmann, K., Pirsch, P., "Memory Organization of Single–Chip Video Signal Processing System with Embedded DRAM", Proceedings of the Ninth Great Lakes Symposium on VLSI, Mar. 1999, pp. 42–45.*

Matsuo, M., Kondo, H., Takata, Y.M Kobayashi, S., Satoh, M., Yoshida, Y., Saito, Y., Hinata, J., "A 32–bit Superscalar Microprocessor with 64–bit Processing and High Bandwidth DRAM Interface", ICCD: VLSI in Computers an.*

Saulsbury, A., Huang, S., Dahlgren, F., "Efficient Management of Memory Hierarchies in Embedded DRAM Systems", ICS'99 Rhodes Greece, ACM 1999, pp. 464–473.*

Kang, Y., Torrellas, J., Huang, T. S., "IRAM for Rasterization", ICIP98 Proceedings, vol. 13, 1998 pp. 110–1013.*

Cox, M. and Bhandari, N., "Architectural Implications of Hardware–Accelerated Bucket Rendering on the PC", 1997 SIGGRAPH/Eurographics Workshop, 1997, pp. 25–34.*

Sase, I., Shimizu, N., and Yoshikawa, T., "Multimedia LSI Accelerator with Embedded DRAM", IEEE Micro, Nov./Dec. 1997, pp. 49–54.*

Search Report for PCT/US 00/10634 mailed Jul. 12, 2000; 4 pages.

* cited by examiner

Primary Examiner—Ulka J. Chauhan
(74) Attorney, Agent, or Firm—Woodcock Washburn LLP

(57) ABSTRACT

A method and apparatus for graphical processing. A logic core to perform pixel fragment manipulation and processing is instantiated on a single substrate with one or more memory units. The memory units are dynamically segmentable into frame buffer and texture memory. Because the logic core is on the same substrate as the memory units, the bandwidth between the core and the memory is greatly increased.

7 Claims, 12 Drawing Sheets

| Resolved (non-MS) Format | Color Bits/Pixel | [Z, S] Bits/Pixel | Multisample Format | Bits/Sample | [Z, S] Bits/Sample | 8MS Speed |
|---|---|---|---|---|---|---|
| RGBA s10e5 | 64 | [28,0], [28,1], [27,4], [23,8] | RGBA s10e5 | 96 | [28,0], [28,1], [27,4], [23,8] | ~.5X |
| RGBA s15 | 64 | [28,0], [28,1], [27,4], [23,8] | RGBA s15 | 96 | [28,0], [28,1], [27,4], [23,8] | ~.5X |
| RGBA 12 | 64 | [28,0], [28,1], [27,4], [23,8] | RGBA 12 | 64 | [15,0], [14,1], [11,4] | 1X |
| RGBA 12 MS10 (d) | 64 | [28,0], [28,1], [27,4], [23,8] | RGBA 10 | 64 | [23,0], [22,1], [19,4], [15,8] | 1X |
| RGBA 8 | 32 | [28,0], [28,1], [27,4], [23,8] | RGBA 8 | 64 | [28,0], [28,1], [27,4], [23,8] | 1X |
| RGB 10 (d) | 32 | [28,0], [28,1], [27,4], [23,8] | RGB 8 | 64 | [28,0], [28,1], [28,4], [28,8] | 1X |
| LA s15 | 32 | [28,0], [28,1], [27,4], [23,8] | — | — | — | — |
| LA s10e5 | 32 | [28,0], [28,1], [27,4], [23,8] | — | — | — | — |
| CI 16 | 32 | [28,0], [28,1], [27,4], [23,8] | — | — | — | — |

Figure 4a

| Texture Formats | Bits/Texel |
|---|---|
| L_comp | 4 |
| RGB_comp | 4 |
| L8 | 8 |
| LA_comp | 8 |
| RGBA_comp | 8 |
| L16 | 16 |
| L_S10E5 | 16 |
| LA8 | 16 |
| L12A4 | 16 |
| R5G6B5 | 16 |
| RGB5A1 | 16 |
| RGBA4 | 16 |
| Z28 | 32 |
| LA16 | 32 |
| LA_S10E5 | 32 |
| RGB8 | 32 |
| RGB10 | 32 |
| RGBA8 | 32 |
| RGB10A2 | 32 |
| RGB16 | 64 |
| RGB_S10E5 | 64 |
| RGBA16 | 64 |
| RGBA_S10E5 | 64 |

Figure 4b

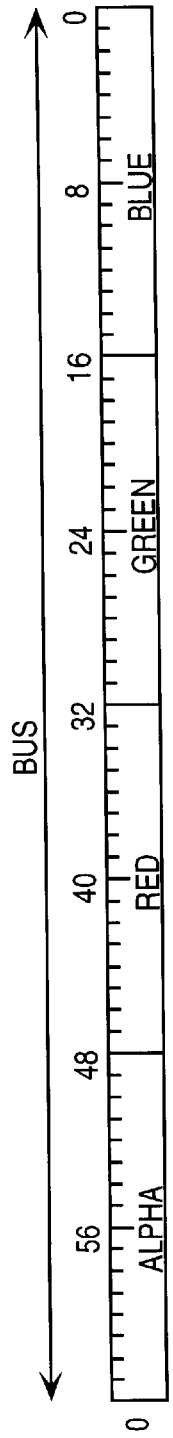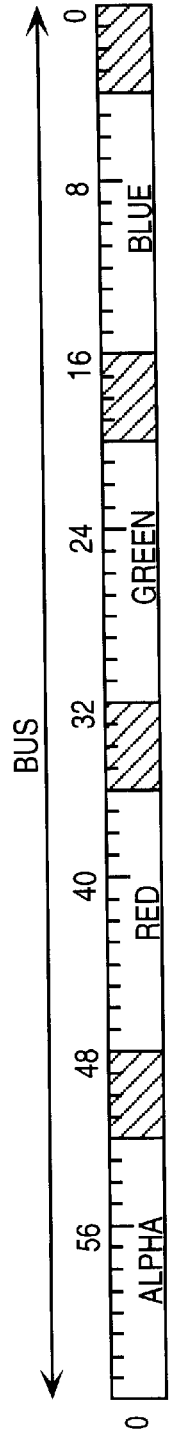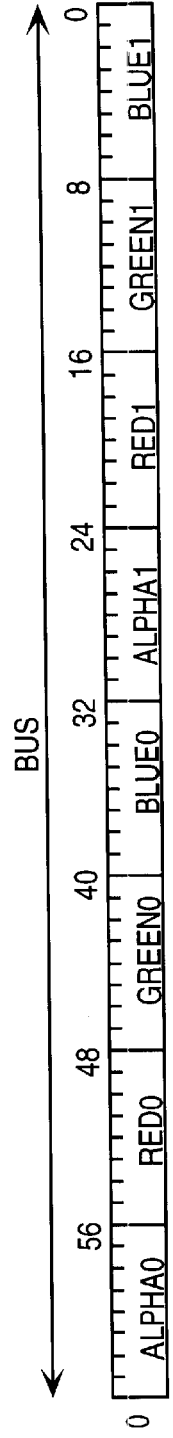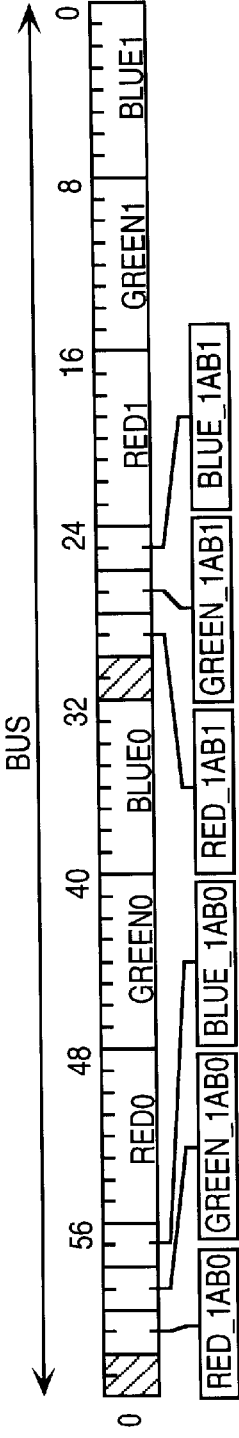

COMBINED FLOATING-POINT LOGIC CORE AND FRAME BUFFER

BACKGROUND OF THE INVENTION (1) Field of the Invention

The invention relates to a graphics subsystem. More specifically, the invention relates to frame buffer and texture memory in a graphic subsystem.

(2) Background

Typical prior art systems use a texture memory and a frame buffer, both instantiated as separate commodity DRAM chips driven by a graphics controller. This use of commodity DRAMs has been widely accepted because it permits easy modification or expansion of the graphic subsystem, permitting either texture memory or frame buffer size to be easily enlarged. Unfortunately, separation of the frame buffer and texture memory has caused some consumer confusion since expansion of the frame buffer memory size does not expand the texture memory and vice versa. Furthermore, this separation requires separate control logic which increases cost. Additionally, insufficient bandwidth is also a chronic problem for graphical subsystems. Accordingly, the additional bandwidth necessary to retrieve texture data makes combining texture memory with frame buffer memory impractical in such systems.

Pixel quality both in number of colors and resolution is affected by the depth (or number of bits) used to represent the pixel. Common pixel representations use 24 bits, eight bits for each component, in red green blue (RGB) format. Higher end systems use many more bits per pixel. Such systems may employ from 128 bits per pixel all the way up to 1024 bits per pixel (including stencil buffer, overlay buffer, z-buffer and up to eight samples per pixel, depending on the format and whether double buffering is used). These deeper pixels require significant bandwidth to retrieve data from the frame buffer memory. To resolve this problem, designers have taken advantage of massive parallelization, often using forty or more (in at least one case, one hundred sixty) distinct DRAM chips interfacing with the graphics controller to achieve the bandwidth required to move these pixel sizes fast enough for quality graphical renderings. This large number of chips on a single board necessarily implies a vast number of pin interconnections. These interconnections increase manufacturing difficulty and correspondingly the possibility of graphical subsystem failure.

Another problem faced in prior art systems is aliasing, which causes edges to appear jagged. One solution to the full scene aliasing is multisample anti-aliasing. Unfortunately, multisample anti-aliasing exacerbates the bandwidth constraints discussed above. Moreover, it requires even larger amounts of memory to instantiate the frame buffer. For example, typical multisample anti-aliasing renders the image four to eight times larger than the image will be displayed. That larger rendered image is then filtered down to the appropriate size. However, this larger rendering requires moving four or eight times the amount of data and therefore requires four to eight times the amount of bandwidth.

In view of the foregoing, it would be desirable to be able to combine frame buffer and texture memory in a single unit while expanding bandwidth and simplifying manufacturing.

BRIEF SUMMARY OF THE INVENTION

A method and apparatus for graphical processing is disclosed. A logic core to perform pixel fragment manipulation and processing is instantiated on a single semiconductor substrate with one or more memory units. The memory units are dynamically segmentable into frame buffer and texture memory. Because the logic core is on the same substrate as the memory units, the bandwidth between the core and the memory is greatly increased.

BRIEF DESCRIPTION OF THE DRAWINGS

FIG. 4a is a table of frame buffer formats and modes supported by an M chip of one embodiment of the invention.

FIG. 4b is a table of texture formats and modes supported by an M chip of one embodiment of the invention.

DETAILED DESCRIPTION

Figure 1:
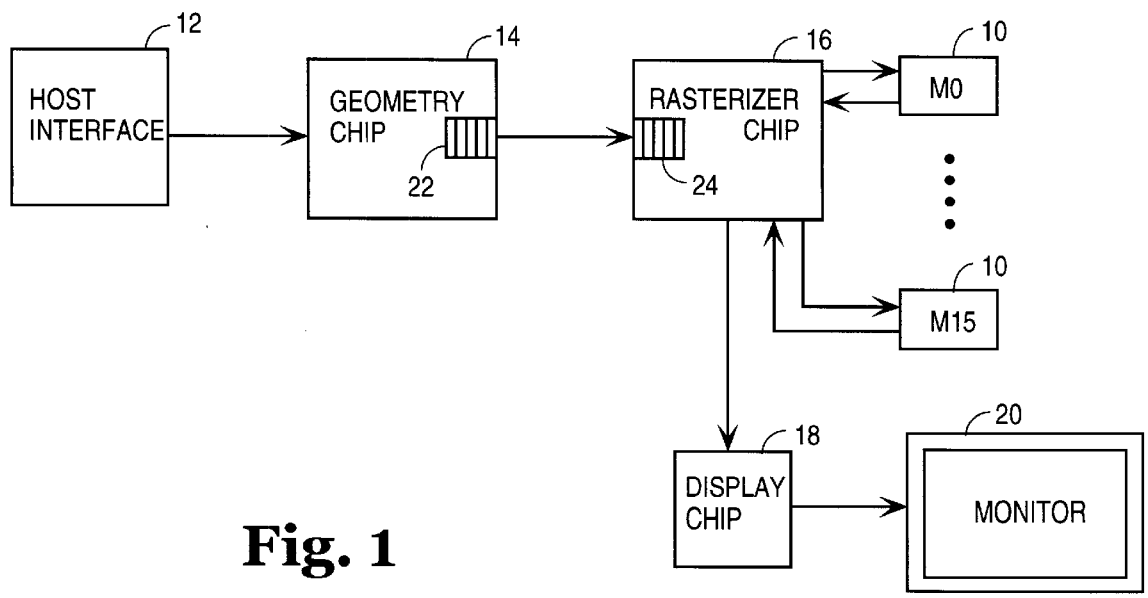
FIG. 1 is a block diagram of a graphics subsystem of one embodiment of the invention.

FIG. 1 is a block diagram of a graphics subsystem of one embodiment of the invention. A host interface 12 conveys data to a geometry chip 14. Geometry chip 14 uses the data to create vertices of primitives. These vertices and various lighting data are forwarded to a rasterizer chip 16 which performs interpolation to generate the other pixel fragments necessary to render the primitive. In one embodiment, the primitive is rendered consistent with the OpenGL Programming Guide, 2nd Ed. Addison-Wesley, 1997 and OpenGL Reference Manual, 2nd Ed., Addison-Wesley, 1997, which describe OpenGL version 1.1. The rasterizer chip 16 is coupled to a plurality of combined memory and logic chips (referred to herein as M chips) 10 which provide texture memory and frame buffering. The rasterizer chip 16 is also coupled to display chip 18 which directs the rasterizer chip 16 what data to retrieve from the frame buffer and provides some formatting of that data before sending it to be displayed on a monitor 20. Buffering, such as FIFOs 22 and 24, is provided in the geometry chip 14 and the rasterizer chip 16 to help ensure that these chips are able to operate at full capacity.

In one embodiment, a load balancing mechanism is provided as part of the M chip 10. The load balancing mechanism helps to ensure that all M chips can remain fully utilized. Typically, the rasterizer chip will send several commands to a first M chip 10. The commands will be buffered in the load balancing FIFO to be acted on by the M chip 10 as soon as possible. Meanwhile, the rasterizer chip 16 supplies commands to each of the other associated M chips 10, returning to supply the first M chip 10 as or shortly before it exhausts the commands in its load balancing FIFO.

It is noted that only a single rasterizer chip 16 is shown connected to the geometry chip 14. It is within the scope and contemplation of the invention to have multiple rasterizer chips 16 each with its own complement of M chips 10. Moreover, while each rasterizer chip 16 is shown having a complement of up to sixteen M chips 10, it is within the scope and contemplation of the invention to have more or fewer M chips 10 associated with each rasterizer chip 16. It is also within the scope and contemplation of the invention that the rasterizerization function may be integrated as part of the M chip.

Figure 2:
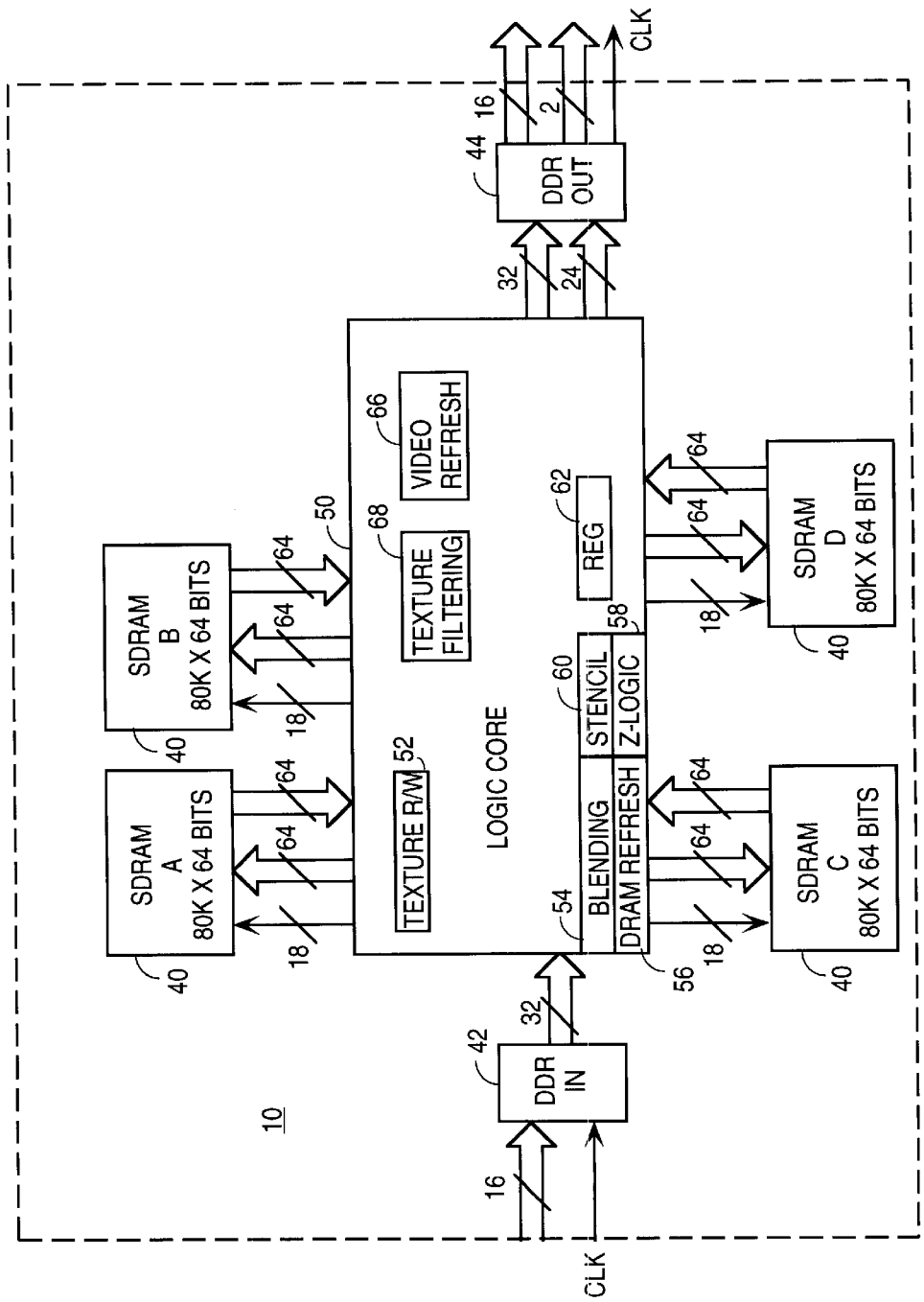
FIG. 2 is a block diagram of a combined memory and logic chip of one embodiment of the invention.

FIG. 2 is a block diagram of a combined memory and logic chip of one embodiment of the invention. A logic core 50 is instantiated on a single substrate with one or more memory units 40. In one embodiment, this single substrate is a single semiconductor substrate, which is commonly referred to as an IC (integrated circuit), or a chip. In FIG. 2, four memory units 40 reside on the substrate with the logic core 50 and are coupled thereto by a plurality of address and control lines and a plurality of data lines running in both to and from the memory. In one embodiment, eighteen control/address lines are provided and sixty-four data lines are provided in each direction. Each memory unit 40 may include both frame buffer memory and texture memory. The memory units 40 are shown as 80K×64 bits. Other sizes of memory units are within the scope and contemplation of the invention.

By providing four memory units with four ports, this embodiment of the invention hides the latency associated with memory transactions. For example, when a memory location is read, it typically takes three clock cycles for valid data to appear on the bus. In this scenario, the logic core 50 can send a read to a first memory bank in cycle 0, a second memory bank in cycle 1, a third memory bank in cycle 2, and a fourth memory bank in cycle 3. Then in cycle 4, the data read from the first memory bank will become available. In this manner, the logic core can be fully utilized. The operation profile is $READ_0$, $READ_1$, $READ_2$, $READ_3$, $Data_1$, $Data_2$, $Data_3$, $Data_4$. It will be understood that using e.g., two memory banks with 128 bit wide ports would result in two cycles of latency, i.e., $READ_1$, $READ_2$, WAIT, WAIT $DATA_1$, $DATA_2$. This results in less efficient use of the core, particularly if the core is designed to manipulate 64 bit quantities. The size of port (here, 64 bits) is selected to provide most efficient processing for the expected pixel depths and core word size. However, other bit widths are within the scope and contemplation of the invention. Significantly, since the core 50 and the memory units 40 are instantiated on a single substrate, much higher and reliable bandwidth between them is achieved.

In one embodiment, the logic core 50 performs floating point operations. The frame buffer is designed to store floating point representations of graphical data. This floating point frame buffer permits a broader range of increasingly complex graphical calculations. Prior art fixed point frame buffers did not permit negative values, thus, if an intermediate value went negative, it was clamped to zero. Notwithstanding that the final value will be positive, permitting intermediate values to go negative, it allows more robust graphical calculations and improved blending characteristics.

The logic core 50 performs all fragment operations such as those described in the OpenGL Reference Manual on data directed towards the frame buffer. In the shown embodiment, logic core 50 includes texture memory read/write logic 52, blending logic 54, stencil buffer logic 60, DRAM refresh logic 56, Z buffer logic 58, video refresh logic 66 and texture filtering logic 68. Blending logic 54 could be of the type described in the Open GL Reference Manual. Stencil buffer logic 60 and Z buffer logic 58 could be of the type described in U.S. Pat. Nos. 5,394,170 and 5,038,297 entitled Apparatus and Method for Controlling Storage of Display Information in a Computer System and Method and Apparatus for Clearing a Region of Z-Buffer, respectively. Texture memory read/write logic 52 and texture filtering logic 68 could be of the type described in U.S. Pat. No. 5,706,481 entitled Apparatus and Method for Integrating Texture Memory and Interpretation Logic in a Computer System. Logic supporting any other fragment operations may also be provided. One or more registers 62 indicate boundaries between different memory sections of the memory units 40.

M chip 10 has a plurality of data lines entering a double data rate interface 42. The double data rate interface 42 operates at double the frequency of either the rasterizer chip or the logic core 50. In one embodiment, the rasterizer chip and the core each operate at 143 MHz and the interface 42 operates at 286 MHz. This can be accomplished by clocking the interface on both rising and falling edges of the input clock. This more rapid operation of the interface reduces the bandwidth effect of pin constraints. Similarly, a double data rate output interface 44 is provided. Two plurality of outgoing data lines exist. One is used when, for example, a full pixel is readout, while the second plurality of outgoing data lines is used when only a small amount of information, such as Z data, is to be sent back to the rasterizer for post processing. It has been found that because of the usage profile of these outgoing data streams, providing two distinct outgoing paths allow greater efficiency, including partial overlap of operations.

Figure 3:
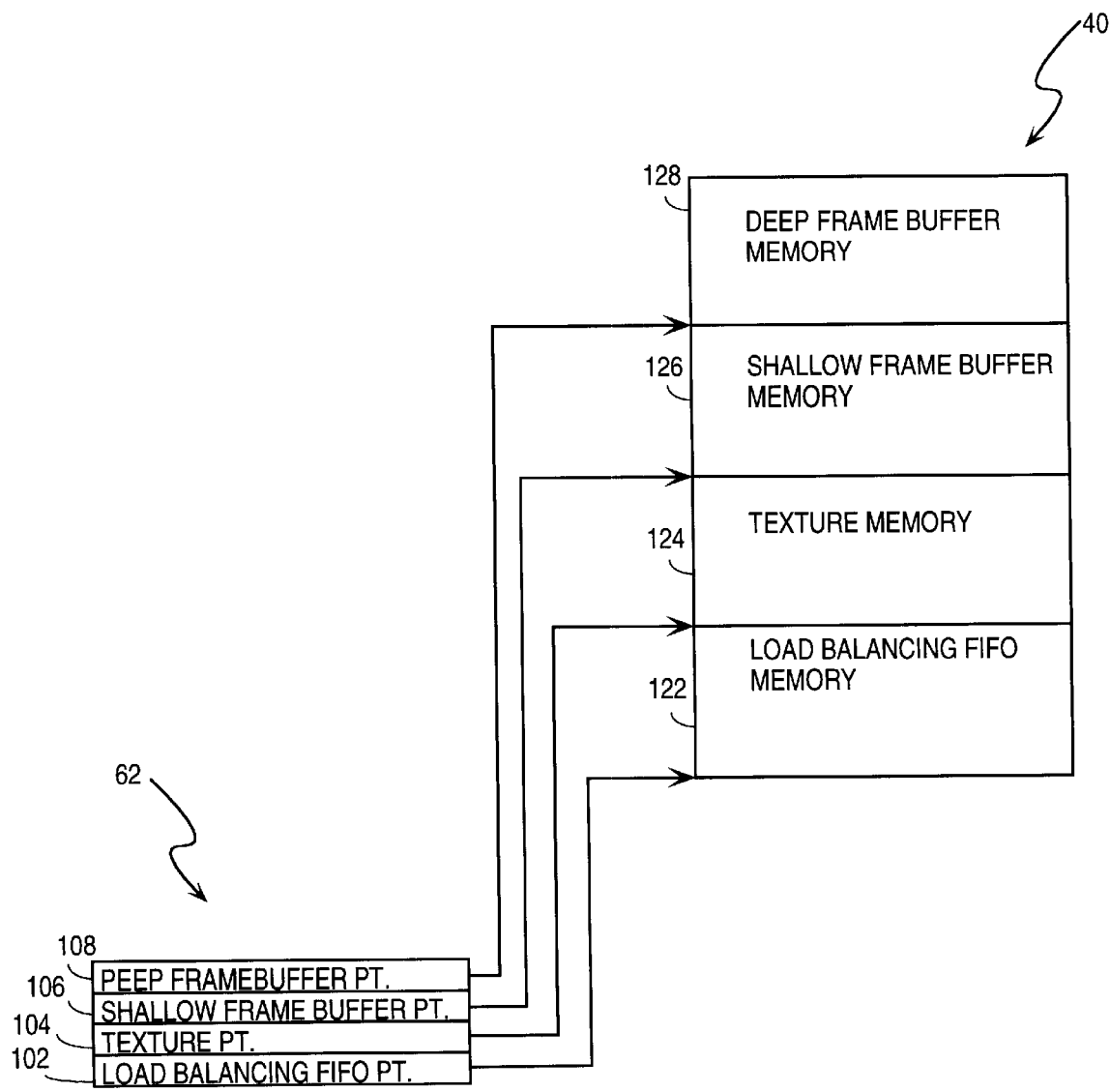
FIG. 3 shows a block diagram of a memory organization of a memory unit and corresponding register stack of one embodiment of the invention.

In one embodiment, incoming data from the geometry chip is routed by the rasterizer in groups to the load balancing FIFO storage area in the memory units 40 of the M chip 10. FIG. 3 shows a block diagram of a memory organization of a memory unit 40 and corresponding register stack 62 of one embodiment of the invention. Register stack 62 contains four registers. A first register 102 contains an load balancing FIFO pointer, a second register 104 contains a texture pointer, a third register 106 contains a shallow frame buffer pointer, and a fourth register 108 contains a deep frame buffer pointer. These point respectively to the bottom of memory allocated for load balancing FIFO, texture, shallow frame buffer, and deep frame buffer. The memory types are described in detail in co-pending application Ser. No. 09/294,450 entitled Apparatus and Method for Sharing Anti-Aliasing Memory Across Multiple Displays, filed Apr. 19, 1999. It will be understood that the pointers may point to the top of the relevant memory segment. Use of additional registers and pointers is within the scope and contemplation of the invention. It is noted that the amount of memory allocated between these memory types will typically vary widely.

The described M chip memory organization permits very fast copying of data from frame buffer memory to texture memory. The data never needs to leave the substrate. Initially, the core logic reads the frame buffer data from a location in a frame buffer memory. Then the data is repacked into a selected texture format. The texture formats supported are shown in FIG. 4b, discussed below. In some cases, the repacking may necessitate reduction in a number of bits used to represent the texture from the number of bits in the source data. By way of example, if RGBA12 is to be packed for texture RGB10 as 32 bits, some bits are eliminated as part of the repacking. The core logic determines which bits are least important to the texture representation and eliminated those bits. The repacked data is then written to texture memory. This is useful where something drawn to the frame buffer is to be used as texture. It is also very useful because it permits the texture memory to be used to store intermediate values to solve complex computational problems.

Similarly, very fast copying from one location in the frame buffer to another location in the frame buffer is also possible. In one embodiment, the system can operate in a multisample anti-aliasing mode. This is facilitated by the greater bandwidth possible between the logic core and the frame buffer on the same semiconductor substrate. In the multisample formats, more than one buffer is used. Since only the front buffer of a 1024 deep pixel is displayable, the fast copy between frame buffer locations is useful to move different samples (buffers) of a pixel relative to one another to change the buffer that may be displayed. Movement of samples within a pixel does not require repacking because the data formats of the source and destination are the same with any pixel.

The M chip of one embodiment of the invention also supports a fast clear mode in which blocks of frame buffer memory are cleared rapidly. As use in this context, clear indicates that the memory location is set to a predetermined value corresponding to a desired "cleared" color. This cleared color may be white, black, or any slected background color and may be dynamically changeable as between distinct clear sequences. The fast clear effectively performs a block write of a number of selected pixels. By way of example, one embodiment permits 4×4 and 2×1 fast clear modes. In 4×4 mode, an address for a top left pixel in a 4×4 block is indicated in a clear packet. The core logic then clears automotaically all sixteen pixels of the block. The 2×1 mode is much slower at clearing but permits greater granularity so that individual pixels may be cleared.

Various forms of anti-aliasing are generally known in the art. While multisample anti-aliasing is used in the shown embodiment, in an alternative embodiment of the invention, other anti-aliasing techniques such as A-buffer anti-aliasing, area-based anti-aliasing, or fragment-based anti-aliasing may be used.

The registers 62 are deemed dynamically configurable, permitting reallocation of memory as between the different memory types. At start up, the operating system (O/S) will configure the register for a particular mode and resolution. A user (or application) may select a frame buffer size and mode of operation that the user wants to employ. Based on mode and resolution, a minimum frame buffer size is established. This dictates an amount of memory which must be allocated to the shallow frame buffer and deep frame buffer memory. From there, texture memory and load balancing FIFO memory are permitted to occupy the remainder of the memory unit.

FIG. 4a is a table of frame buffer formats and modes supported by an M chip of one embodiment of the invention. The table is divided into resolved formats and multisample formats. It should be noted that there is a one-to-one correspondence between the resolved format and the multisample format, i.e. there is a resolved format corresponding to each multisample format. In the nomenclature of the table, RGBA s10e5 indicates that for each red, green, blue, and alpha, there are a sign bit, ten bits of the base and five bits of exponent. Floating point frame buffer operation is described in application Ser. No. 09/098,041, now abandoned, entitled Display System Having Floating Point Rasterization and Floating Point Frame Buffering. Accordingly, sixteen bits are devoted to each of red, green, blue, and alpha, for a total of sixty-four bits of color data per pixel. Notably, this format requires floating-point processing and floating-point storage. The remaining RGB formats employ the same nomenclature. Additional resolved formats, including luminance alpha (LA) and color index (CI) formats, are supported.

For display purposes, the multisample format must be resolved before display. This resolving is performed by the logic core of the M chip, before data is sent to be displayed. The symbol "(d)" indicates that multisample dithering is used to allow fewer bits per sample than in the resolved buffer. In one embodiment of the invention, up to 31 bits may be split between Z data and stencil data. The maximum size of the Z data is 28 bits. In the resolved formats, the Z and stencil data are packed in separate words from the color data. The multisample formats have the color bits, and Z and stencil bits are packed together to reach the bits per sample total shown in the table. Further discussion of how the formats are packed in the frame buffer is discussed below.

FIG. 4b is a table of texture formats and modes supported by an M chip of one embodiment of the invention. The nomenclature of the texture formats is generally the same as the nomenclature of the frame buffer formats discussed above. In one embodiment, any texture format may be used with any frame buffer format, as the two are independent. The nomenclature of the texture format "_comp" indicates a compressed format in which the number of bits per textel is reduced and no meaningful separation of component data is possible. General operation of texture memory and various texture formats will be understood by one of ordinary skill in the art.

Figure 5A:
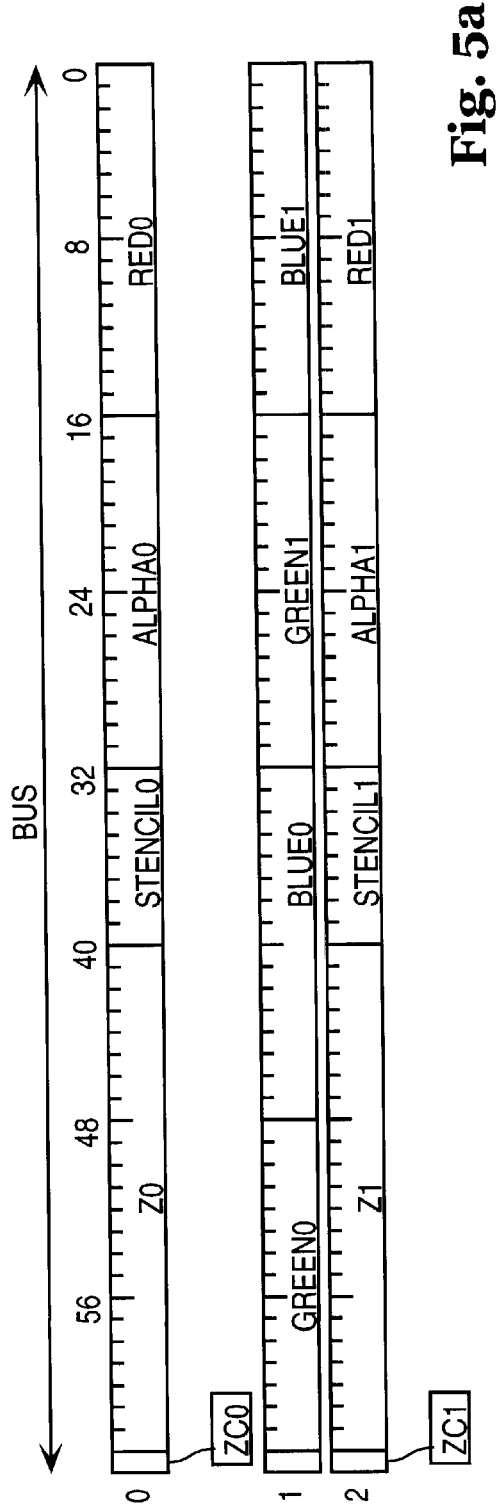
FIGS. 5a–5u show various frame buffer packings of one embodiment of the invention.
Figure 5B:
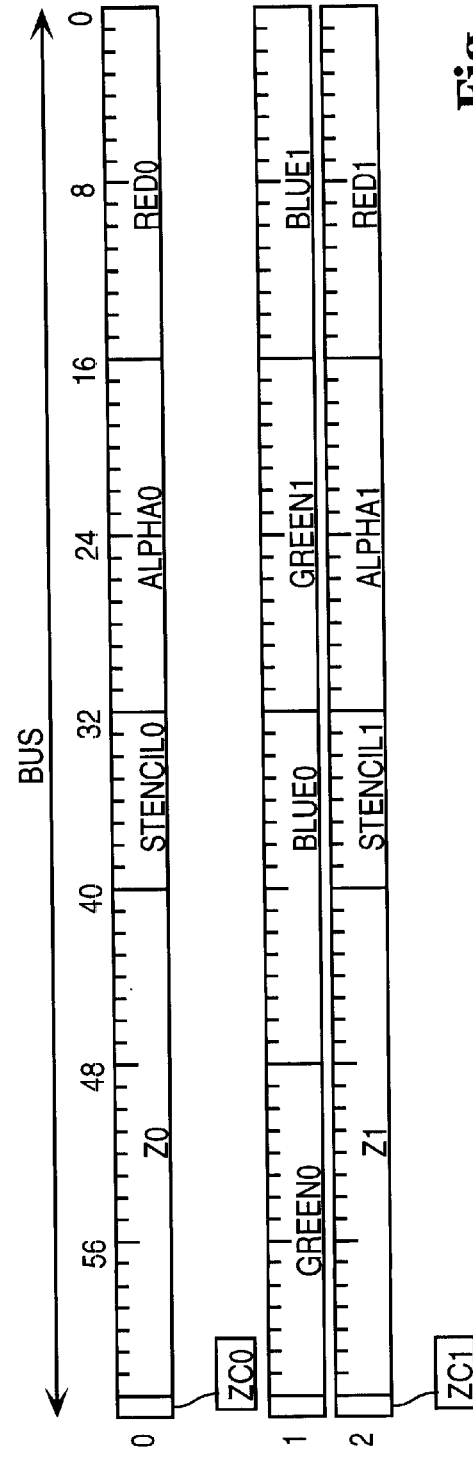
Figure 5C:
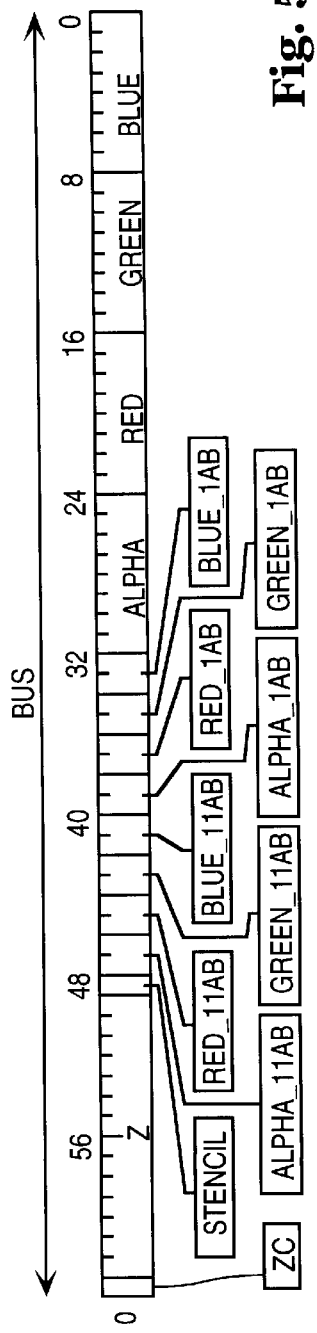
Figure 5D:
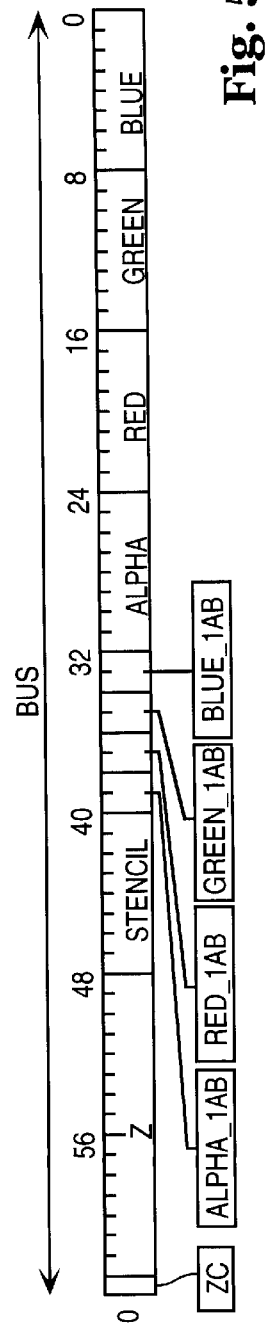
Figure 5E:
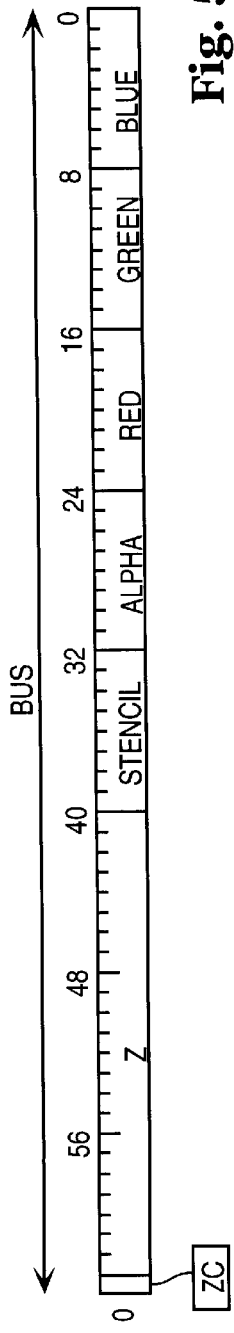
Figure 5F:
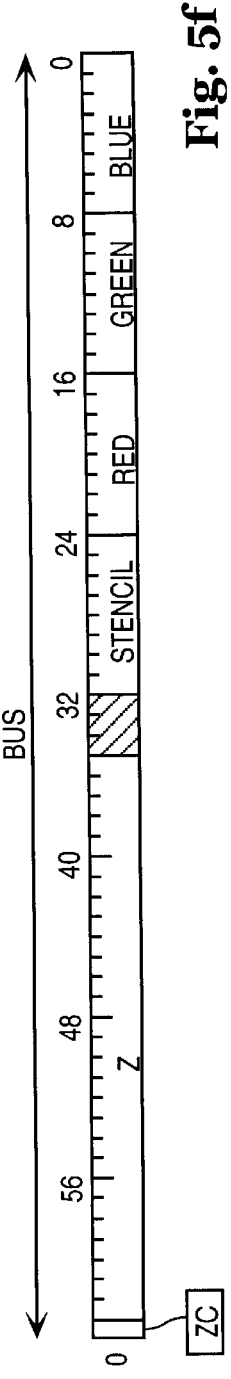
Figure 5K:
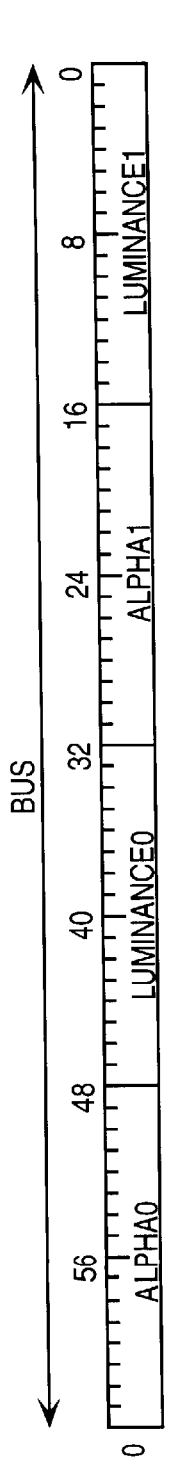
Figure 5L:
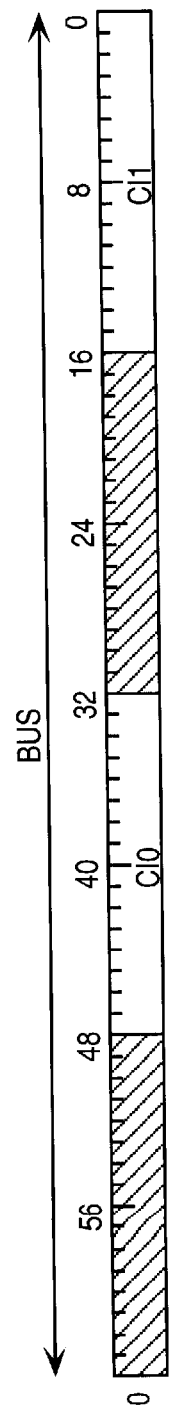
Figure 5M:
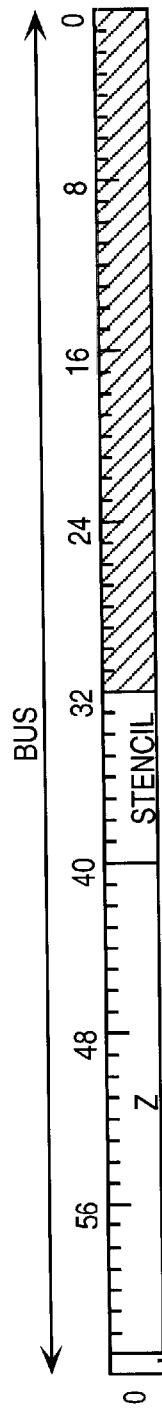
Figure 5N:
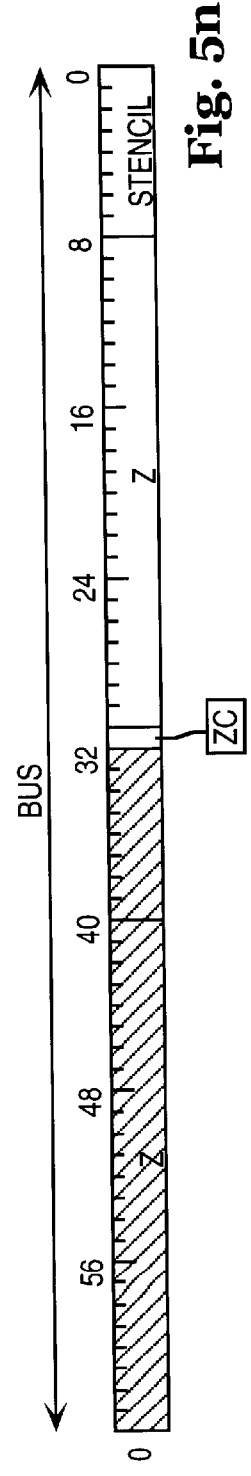
Figure 5O:
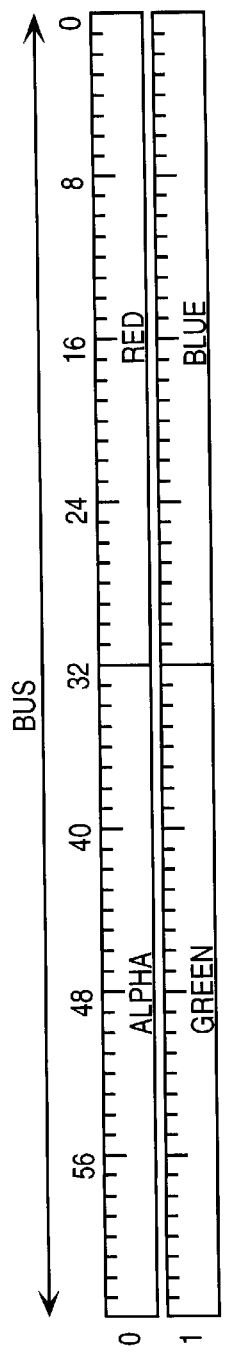
Figure 5P:
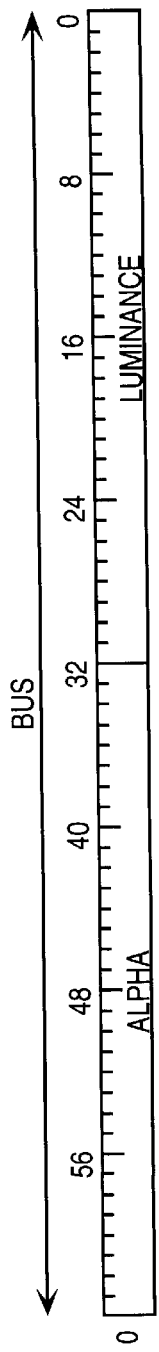
Figure 5Q:
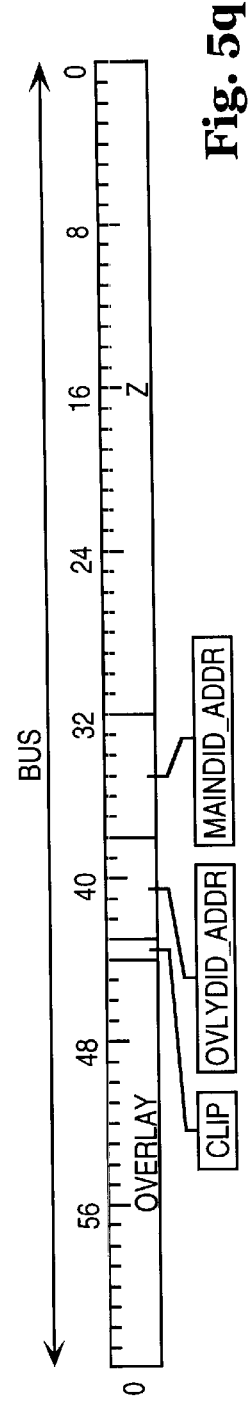
Figure 5R:
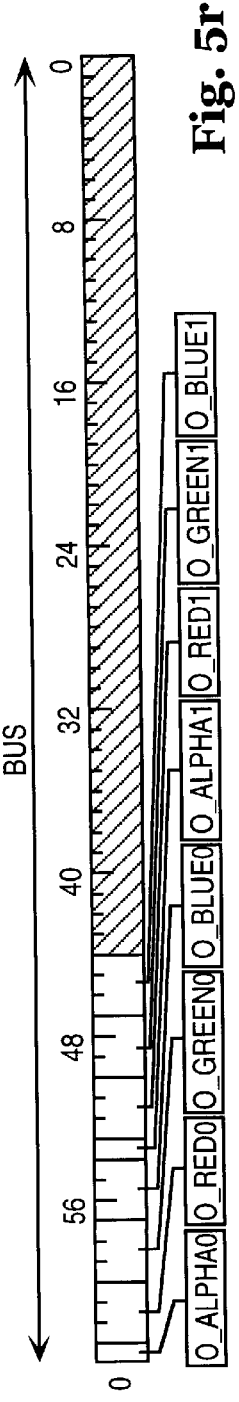
Figure 5S:
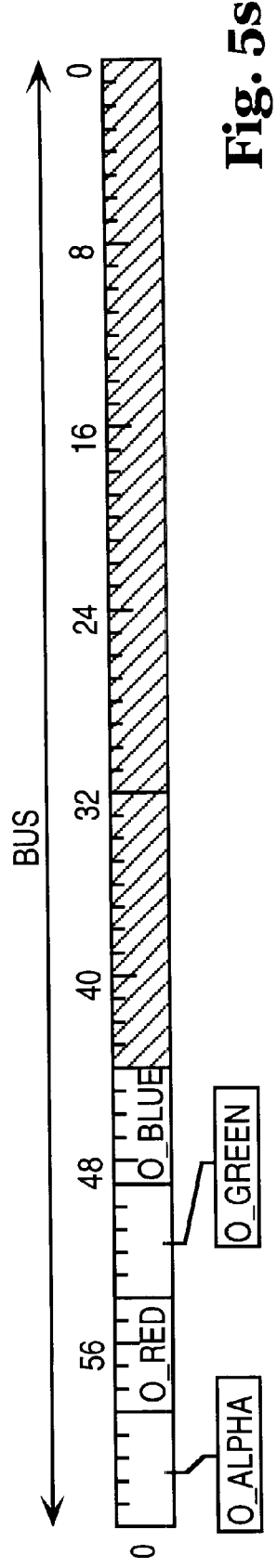
Figure 5T:
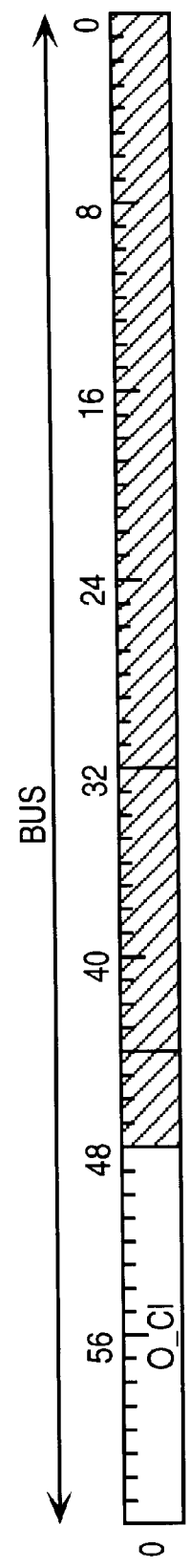
Figure 5U:
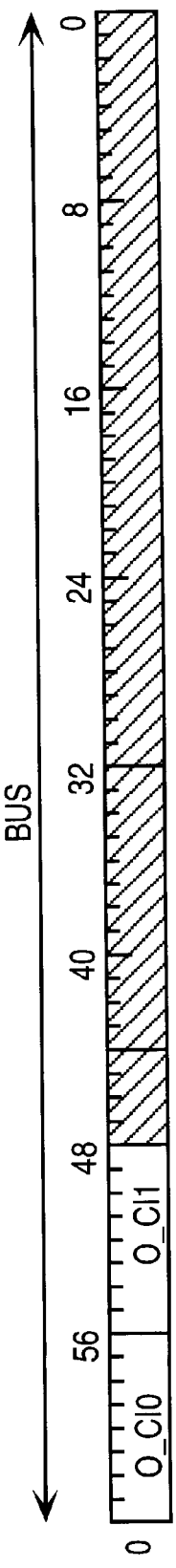

FIGS. 5a–5u show various frame buffer packings of one embodiment of the invention. FIG. 5a shows packing of the RGBA s10e5 multisample format into 64 bit words. ZC0 designates the Z culling bit for sample 0. Z culling is described in patent application Ser. No. 09/069,971 filed Apr. 30, 1998, now U.S. Pat. No. 6,246,415, entitled Method and Apparatus for Culling Polygons. FIG. 5a shows the packing of two samples. After two samples, the pattern repeats. FIG. 5b shows the packing of two samples in RGBA S15 multisample format. Again, after two samples, the pattern repeats. Notably, this packing format is the same as shown in 5a above.

FIG. 5c shows packing of multisample RBGA 12 into 64 bits. Notably, the high order bits of the color values are stored separately from the corresponding low order bits. Accordingly, after retrieval, it is necessary for the logic core to reassemble actual color values before sending them out to the R chip for display. FIG. 5d shows packing of a multisample RGBA 10 sample into 64 bits. Similarly, FIGS. 5e and 5f shows RGBA 8 and RGB 8 multisample formats packed into 64 bits.

FIG. 5g shows the packing of RGBA s10e5 and RGB s15 in resolved format. As mentioned above, the Z value corresponding to this color data is packed in separate words as shown in FIGS. 5m and 5n. Whether the upper or lower half of the word is used for the storage is at the user's discretion. FIGS. 5o and 5p show an 8 bit stencil buffer. Other stencil buffers are possible as shown in the table of FIG. 4. FIG. 5h shows resolved format RGBA 12 as packed in one embodiment of the invention. FIG. 5i shows two RGBA 8 buffers packed into 64 bits. FIG. 5j shows RGB 10 packed into 64 bits. FIG. 5k shows packing of either LA s10e5 or LA s15 buffers packed into 64 bits. Two such buffers are packed into 64 bits. FIG. 5m shows the packing of two CI 16 buffers into 64 bits. Each CI 16 buffer is allotted 32 bits, notwithstanding that it could be packed into less space. This improves retrieval efficiency and is deemed a satisfactory tradeoff for the extra space used.

FIG. 5o shows an accumulation buffer for the RBGA formats for all RGB accumulation buffers for a fixed point frame buffer occupying 128 bits of memory. For floating point formats, the accumulation is software emulated. FIG. 5r shows the accumulation buffer for LA formats. The accumulation buffer for such LA formats occupies the 64 bits of memory. Accumulation buffers are generally well understood in the art.

FIG. 5q shows a typical tag word of one embodiment of the invention. A tag word includes an overlay buffer. The format of possible overlay buffers are shown in FIGS. 5r–5u. The tag word also includes a clip bit, overlay address and a main ID address. The upper 32 bits of word0 of every pixel contains the tag word. The lower 32 bits normally contain a non-multisample depth buffer or may store a 32 bit P buffer.

Figure 6:
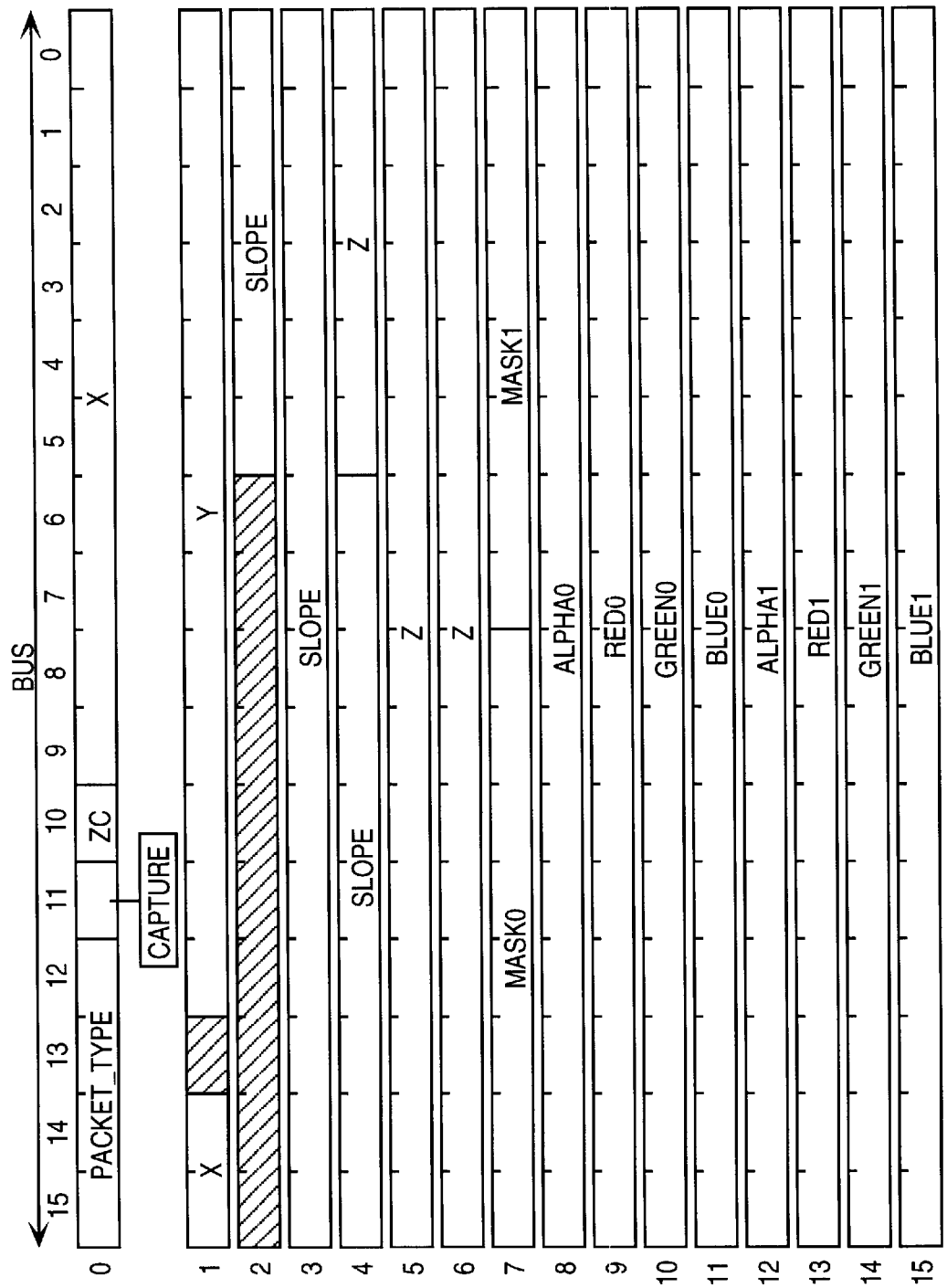
FIG. 6 is a diagram of a typical fragment packet which might be received by an M chip from a rasterizer chip in one embodiment of the invention.

FIG. 6 is a diagram of a typical fragment packet which might be received by an M chip from a rasterizer chip in one embodiment of the invention. A first field identifies the type of packet being transmitted. The packet type is followed by a capture bit and a Z culling bit corresponding to a first pixel. Typically, color data for two pixels will be sent on each transaction from the rasterizer chip to the M chip to avoid stalling the rasterizer chip when it has a full complement of 16 M chips. Each M chip should be able to accept two pixels every sixteen R clocks. This is accomplished by pipelining the M chip operations and providing some buffering. Typically, the two pixels sent will be horizontally adjacent pixels. In a multisample format, the logic core of the M chip is responsible for generating additional samples from the pixel fragment. An X value and a Y value for the first pixel are provided as part of the packet. A Z value in rows 4–6 corresponds to the Z value of the first pixel. The slope in rows 2–4 corresponds to the slope between the first pixel and the second pixel. This avoids the necessity for providing, e.g., eight Z values in multisample format. The M chip upon receiving the two pixels performs expansion to yield, for example, eight samples per pixel in an 8× multisample mode and uses the slope to define the Z values for such samples. Masks 0 and 1 in column 7 have one bit corresponding to each possible sample in an 8× multisample format. The masks may be used to mask out particular samples which are hidden or extend beyond the edge of the image. There remaining rows 8–15 provide the color data for the two pixels to be expanded or drawn into the frame buffer.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:

identifying a resolution and a mode of a graphical format;

setting one or more registers to indicate a first portion of an embedded memory unit dedicated as frame buffer memory and a second portion dedicated as texture memory; and manipulating graphical data in a logic core instantiated on a single substrate with the embedded memory unit.

2. The method of claim 1 wherein the mode is a multi-sample anti-aliasing mode.

3. The method of claim 2 wherein the anti-aliasing mode is one of multisample anti-aliasing, A-buffer anti-aliasing, area-based anti-aliasing, and fragment-based anti-aliasing.

4. The method of claim 1 wherein manipulating further comprises:

performing floating-point operations on the graphical data and writing floating-point representations of the graphical data to the memory unit.

5. The method of claim 1 further comprising:

copying data from the frame buffer memory to the texture memory without the data leaving the substrate.

6. The method of claim 5 wherein copying comprises:

reading the data from a frame buffer location;

repacking the data into a selected texture format; and writing the repacked data to a location in the texture memory.

7. The method of claim 1 further comprising:

copying data from a first frame buffer location into a second frame buffer location without the data leaving the substrate.

\* \* \* \* \*

UNITED STATES PATENT AND TRADEMARK OFFICE
CERTIFICATE OF CORRECTION

PATENT NO. : 6,532,018 B1 Page 1 of 1
DATED : March 11, 2003
INVENTOR(S) : Chen et al.

It is certified that error appears in the above-identified patent and that said Letters Patent is hereby corrected as shown below:

Column 4,
Line 32, please delete "an" and insert therefor -- a --;

Column 5,
Line 25, please delete "automotaically" and insert therefor -- automatically --;

Column 7,
Line 8, please delete "word0" and insert therefor -- word --

Signed and Sealed this

Twenty-second Day of July, 2003

JAMES E. ROGAN
*Director of the United States Patent and Trademark Office*